US006582540B1

(12) United States Patent
Sandmark

(10) Patent No.: US 6,582,540 B1
(45) Date of Patent: Jun. 24, 2003

(54) METHOD FOR MANUFACTURING A PRESSURE TANK

(75) Inventor: Ragnar Sandmark, Gjøvik (NO)

(73) Assignee: Raufoss Composites AS, Raufoss (NO)

(*) Notice: Subject to any disclaimer, the term of this patent is extended or adjusted under 35 U.S.C. 154(b) by 0 days.

(21) Appl. No.: 09/959,448

(22) PCT Filed: Apr. 27, 2000

(86) PCT No.: PCT/NO00/00140

§ 371 (c)(1),
(2), (4) Date: Oct. 25, 2001

(87) PCT Pub. No.: WO00/66939

PCT Pub. Date: Nov. 9, 2000

(30) Foreign Application Priority Data

Apr. 29, 1999 (NO) .......................................... 19992095

(51) Int. Cl.[7] ............................................... B32B 31/28
(52) U.S. Cl. ...................... 156/82; 156/172; 156/274.6
(58) Field of Search .......................... 156/82, 166, 169, 156/172, 274.4, 274.6, 379.6, 379.8, 497

(56) References Cited

U.S. PATENT DOCUMENTS 4,096,013 A 6/1978 Lutzmann et al.
4,415,394 A 11/1983 Cholmar
4,927,038 A * 5/1990 Roebuck ........................ 220/3
5,280,084 A * 1/1994 Paul ........................... 525/375

FOREIGN PATENT DOCUMENTS

EP 0 353 850 A2 2/1990
WO WO 89/09795 A1 10/1989
WO WO 98/30646 A1 7/1998

* cited by examiner

*Primary Examiner*—James Sells
(74) *Attorney, Agent, or Firm*—Rothwell, Figg, Ernst & Manbeck

(57) ABSTRACT

The present invention relates to a method for manufacturing a pressure container comprising an inner liner layer of polymer material, such as polyolephines or a similar material, and an outer, fiber-reinforced and pressure supporting layer, characterized by treatment of the outer side of the inner liner layer so as to increase the wetting and adhesive properties of the polymer material, employing an adhesive at the outer side of the inner liner layer and/or in direct contact between the outer side of the inner liner layer and the inner side of the outer fiber-reinforced, pressure supporting layer, and winding of the outer, fiber-reinforced and pressure supporting layer onto the inner liner layer. In a preferred embodiment the treatment of the outer side of the inner liner layer comprises flaming, but also corona-discharging, possibly in combination with ozone treatment, or a corresponding method for improving the wetting and adhesive properties of the polymer material can also be employed.

4 Claims, 3 Drawing Sheets

METHOD FOR MANUFACTURING A PRESSURE TANK

BACKGROUND OF THE INVENTION

The present invention relates to a method for manufacturing a pressure container comprising an inner liner made of polymer material, such as polyolefines or a similar material, and an outer, fibre-reinforced pressure supporting layer.

PRIOR ART

Pressure containers for fluids have several uses, such as gas containers in hospitals and fuel containers for motor vehicles, but also in a smaller scale such as propane containers for gas stoves in cottages, camping caravans and small crafts or boats for recreational use. As a rule, such containers have been manufactured from metal for security reasons. These has the disadvantage of being heavy and difficult to handle.

One solution to this problem can be to manufacture the pressure container of composite material, making the container of lighter weight and more easy to handle. At the same time, taking care of the safety in a good manner is important. In particular, it is important that the container is impact resisting, so that leakages and explosions with possible following injuries to persons can be avoided.

An example of a solution wherein the pressure container has been manufactured of composite materials is described in European patent No. 0 810 081 A1, including a method for manufacturing pressure containers, wherein an inner, gas-impenetrable liner made of plastic first is blow moulded, and thereafter, an outer layer consisting of a fibre-reinforced plastic which has been soaked in a resin bath, is wound around the liner. However, the inner and the outer layer in this pressure container is not adhered in any other way, which leads to the formation of gas pockets between the layers. This involves a safety risk, as the gas pockets will expand, should underpressure occur inside the container, which may cause a collapse of the inner layer.

Collapse of the inner liner layer may also occur due to service conditions, for example when evacuating the container, giving rise to underpressure inside the container, or when cooling, so that the temperature of the fluid becomes to low. The industry considers the generally low wetting and adhesive properties of plastic materials as a problem. Some of the reasons for this is that several plastic materials have chemical inert and non-porous surfaces, having low surface tensions. The wetting and adhesive properties of plastic materials may be increased for example by flame treatment or by corona discharge treatment. Flame treatment and corona discharge treatment are characterized in that plasma is generated, i.e., a very reactive gas comprising free electrons, positive ions and other chemical conmponents. The physical mechanisms are different, but their impact on the wetting and adhesive properties is similar. The free electrons, the positive ions, the meta-stabile components and the radicals, together with ultravilet radiation (UV radiation) being generated in the plasma areas, may impact the surface with energies that are sufficient to break the molecule bonds on the surface of the polymer material. On the surface of the polymer material, very reactive free radicals are formed, which themselves may form chemical functional groups, cross-link to chemical functional groups, or rapidly react in the presence of oxygen so that functional groups are formed. Polar functional groups which can increase the bonding property of the polymer material comprise among other carbonyl (—C=O), carboxyl (—COOH), hydroperoxide (—OOH) an hydroxylgrupper (—OH). International patent application No. PCT/SE89/00187 describes a similar method for increasing the surface energy and the hydrophilicity on surfaces of polymer materials.

Japanese patent No. JP 63215736 (abstract) of Japanese patent Nr. JP-59093632 (abstract) relates to treatment methods for polymer materials for improvement of the surface properties of the material, but intended for completely different tasks than the present invention.

WO A 98/30646 describes a process for obtaining improved adhesion between the surfaces of two polymer compositions, and a product having several polymer layers. This object is manufactured according to the described process. Apparently, the term product is directed to films and sheets having several polymer layers, and not hollow objects as in the present invention. In claim 1 of the publication, three features of the process are indicated:

1) The polymer compositions are joined by means of corona discharge treatment,
2) the layers are in contact with each other during the plasma treatment, and
3) the electrical field passes through the adjacent surfaces of the polymer compositions.

According to the present invention, corona discharge treatment is a part of the pretreatment before joining of the inner liner layer and the outer, pressure supporting layer. In addition, the inner liner layer is not in contact with the outer fibre-reinforced, pressure supporting layer during the treatment step.

U.S. Pat. No. 4,096,013 describes briefly explained a method for laminating two or more chemically different sheets using a method for laminating two or more chemically different sheets by alternating current electrical corona discharge in air, and an apparatus for laminating at least two chemically different sheets to form a laminate. Appearing from the specification, an object of the invention is that the joined sheets are free of adhesives or adhesive film layers.

U.S. Pat. No. 4,415,394 describes an apparatus for adhering two or more layers by corona discharge treatment. The material is exposed to corona discharge treatment before products are manufactured, as opposed to the present invention, wherein the inner liner layer is a finished part before being treated so as to increase the wetting and adhesive properties.

According to WO A 98/30646, U.S. Pat. Nos. 4,096,013 and 4,415,394, corona discharge treatment is utilised so as to increase the wetting and adhesive properties fo the materials for adhering polymer layers. Manufacturing of films, foil and laminates of several polymer layers are described in these publications. None of these publications show that adhesives are employed between the polymer layers. Also, they do not show that an inner polymer layer/liner layer is rotated during the complete prosess.

The object of the present invention is to avoid the disadvantages mentioned above. By using a method for manufacturing a pressure container according to the present invention, a light-weight, strong pressure container is possible to manufacture, appearing in one piece, and in addition being easy to handle, and being resistent to underpressure inside the container.

SUMMARY OF THE INVENTION

The present invention discloses a method for manufacturing a pressure container comprising an inner liner layer of polymer material, such as polyolefines or a similar material, and an outer, fibre-reinforced, pressure supporting layer. The method is characterized in that, during rotation of the inner liner layer relative to treatment, employment, and/or winding equipment, treatment of the outer side of the inner liner layer so as to increase the wetting and adhesive properties of the polymer material, employment of adhesive onto the outer side of the inner liner layer and/or direct contact between the outer side of the inner liner layer and the inner side of the outer, fibre-reinforced, pressure supporting layer, for adhesion of the inner liner layer and the outer, fibre-reinforced, pressure supporting layer, and winding of the outer, fibre-reinforced, pressure supporting layer onto the inner liner layer.

In a preferred embodiment, the treatment of outer side of the inner liner layer comprise flame treatment, but also corona discharge treatment, if desired, in combination with ozone treatment or a corresponding method for improvement of the wetting and adhesive properties of the polymer material may be used.

DESCRIPTION OF THE DRAWINGS

The present invention will be described more in detail below, with reference to the drawings, showing one possible embodiment.

DESCRIPTION OF THE PREFERRED EMBODIMENTS

Figure 1:
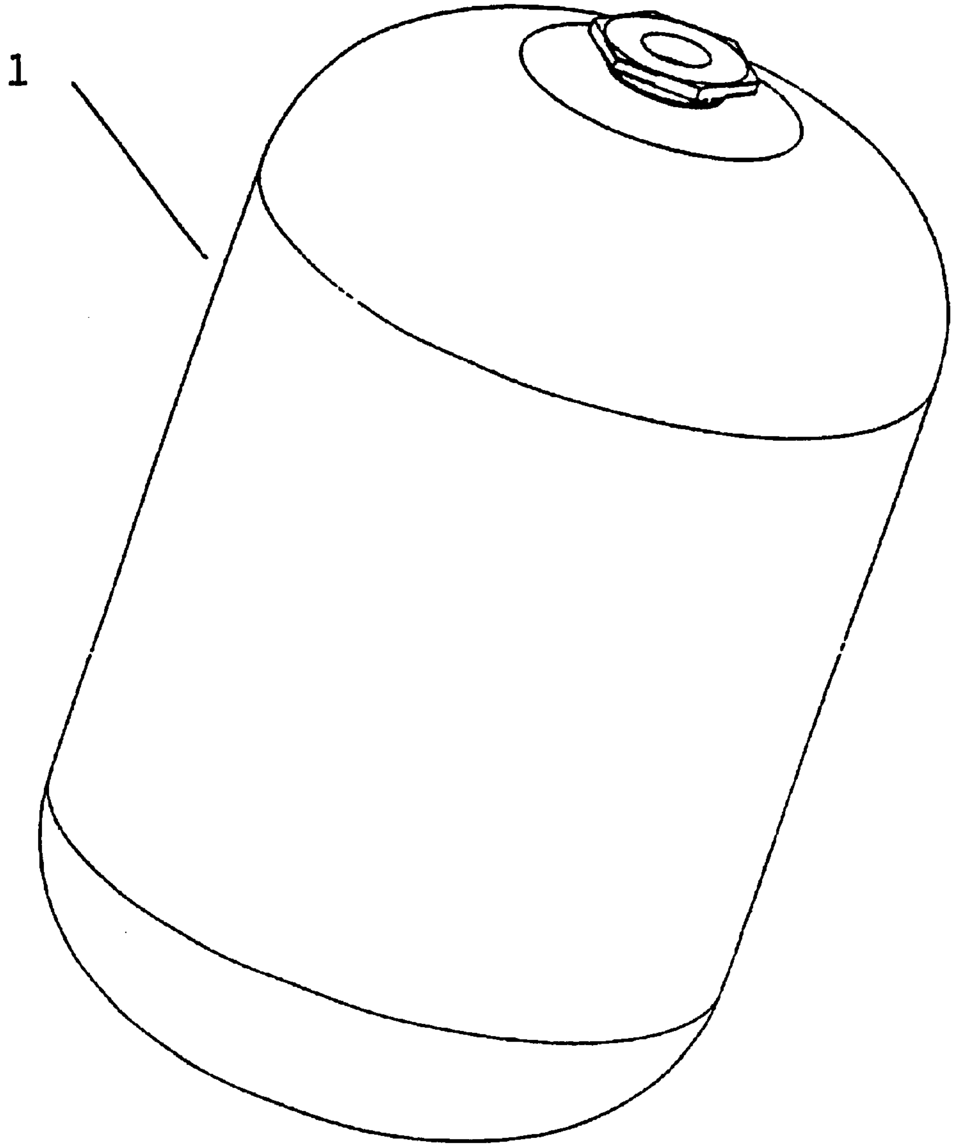
FIG. 1 is an isometric view of an untreated, inner liner layer.

Referring now to FIG. 1, which is an isometric view of an inner liner layer 1 which has not been treated. The inner liner layer is made of a polymer material, such as polyethylene (polyethene) and may be manufactured in a per se known manner, for example by blow moulding, extruding, or a similar method.

Figure 2:
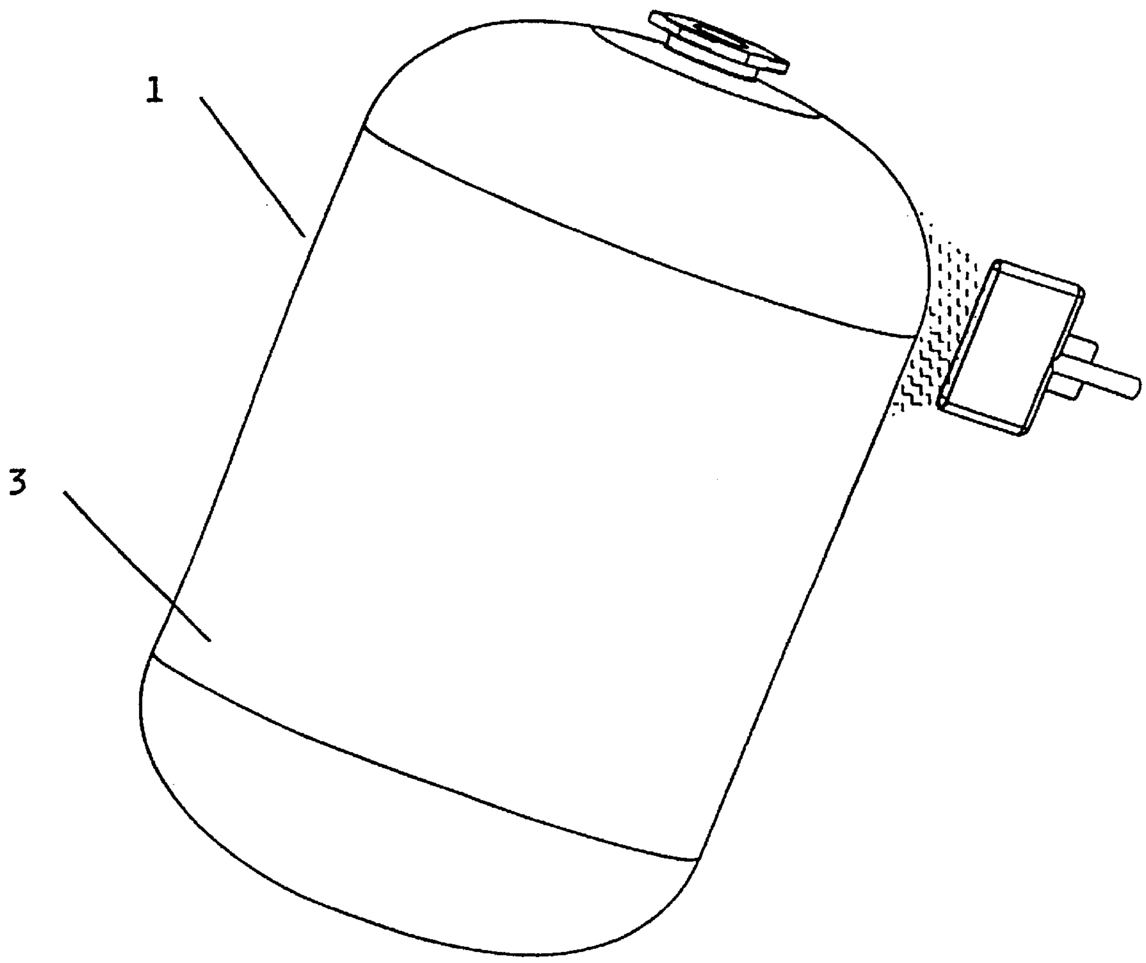
FIG. 2 shows an example of how the liner layer may be treated.

As previously mentioned, polymer materials have low wetting and adhesive properties. By treatment of the surface of the polymer material, these can be increased. FIG. 2 shows an example of such a treatment, by flame treatment of the outer side 3 of the inner layer 1. Some treatment methods are interesting in this connection. In a preferred embodiment, flame treatment or corona discharge treatment, if desired, in combination with ozone treatment.

Surface treatment by flame treatment takes place by flaming of the surface with a burner. Adiabatic flame temperature is about 1800° C. Flame treatment using excess air, i.e., that fuel/air-mixture has excess air in relation to fuel, gives the best surface treatment. The amount of air in relation to the amount of fuel can in other words be expressed as the excess air ratio λ, which is defined as:

$$\lambda = \frac{\text{amount of air}}{\text{stoechiometric amount of air}} = \frac{\left(\frac{m_a}{m_f}\right)}{\left(\frac{m_a}{m_f}\right)_{st}}$$

wherein

| where in | | |
|---|---|---|
| $\lambda = 1$ | gives | stoechiometric combustion, |
| $\lambda > 1$ | gives | excess air (lean), |
| $\lambda < 1$ | gives | deficiency of air (fuel rich), |

and wherein $(m_a/m_f)$ is the ratio between amount of the air and the amount of fuel as is present and $(m_a/m_f)_{st}$ is the ratio between the amount of air and the amount of fuel at stoeichometric combustion.

The amount of air in relation to the amount of fuel may also be expressed as the equivalence ratio Φ:

$$\Phi = \frac{(m_f/m_a)}{(m_f/m_a)_{st}}$$

wherein

| where in | | |
|---|---|---|
| $\Phi = 1$ | gives | stoechiometric combustion, |
| $\Phi < 1$ | gives | excess air (lean), |
| $\Phi > 1$ | gives | deficiency of air (fuel rich), |

and wherein $(m_f/m_a)$ is the ratio between the amount of fuel and the amount of air as present and $(m_f/m_a)_{st}$ is the ratio between the amount of fuel and the amount of air at stoechiometric combustion.

The main components in a flame treatment apparatus may comprise:

one or more burners unit for supplying air/fuel and control of the air/fuel ratio, including a cutoff valve for fuel Use of flame treatment is preferred before corona discharge treatment, as correct tolerances may be more difficult to obtain due to uneven treatment. When using inflammable materials, corona discharge treatment may be a solution of preference. Other alternatives may also be of interest, for example use of cold-gas-plasma treatment or other methods for increasing the wetting and adhesive properties of the polymer material. Moreover, adhesives which harden when exposed to ultraviolet radiation (UVradiation) can be used because such a use also involves an alteration of the properties of the polymer material.

Figure 3:
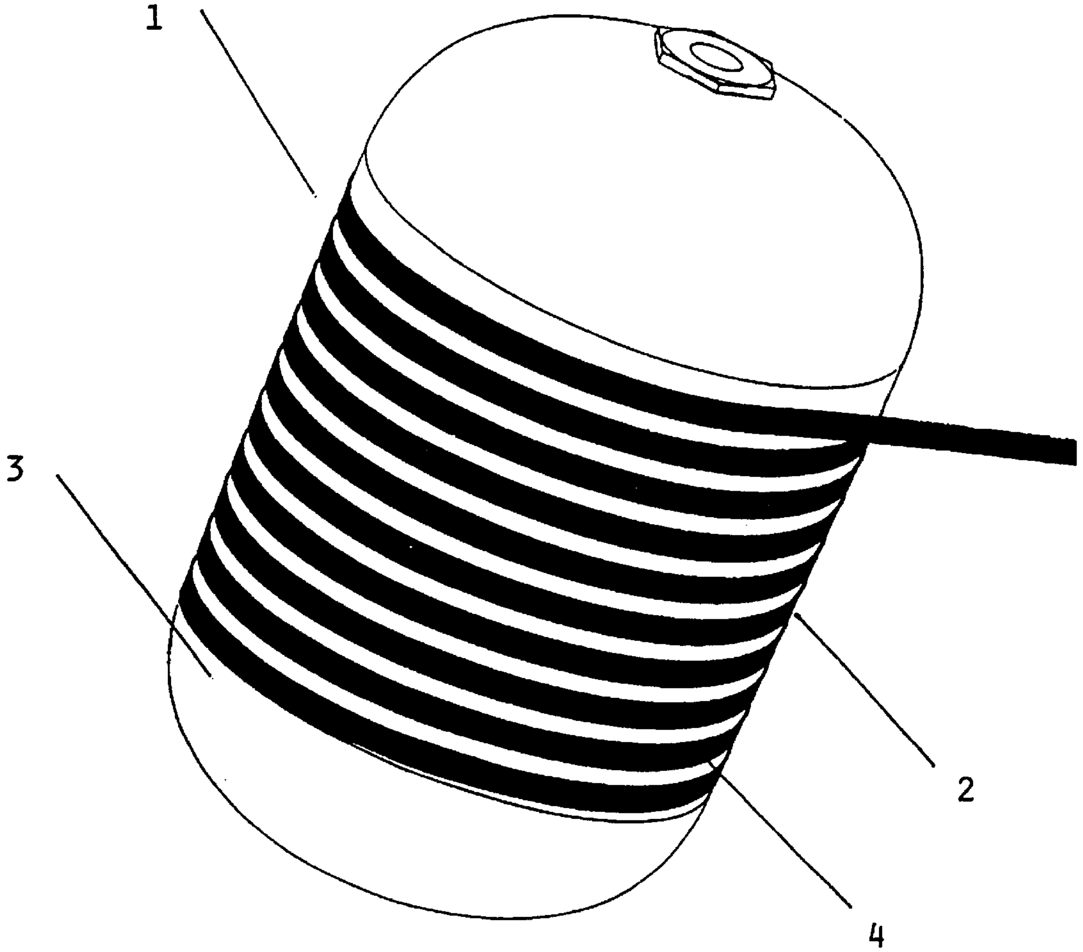
FIG. 3 shows winding of an outer, fibre-reinforced, pressure supporting layer.

FIG. 3 shows winding of an outer, fibre-reinforced, pressure supportin layer 2 onto the inner liner layer 1. Having increased the wetting an adhesive properties of the surface of the polymer material, adhesion between the inner liner layer 1 and the outer, fibre-reinforced, pressure supporting layer 2 is possible to obtain. An epoxy-polymer (not shown) or a similar means may be used as adhesive. The adhesive can be employed onto the outer side 3 of the inner liner layer 1 before winding of the outer, fibre-reinforced, pressure supporting layer 2 onto the outer side 3 of the inner liner layer 1. Alternatively, the adhesive can at first be employed onto the inner side 4 of the outer, fibre-reinforced layer 2 before adhesion of the outer side 3 of the inner liner layer 1. The adhesive may also be employed at the same time as the outer, fibre-reinforced, pressure supporting layer 2 is wound onto the outer side 3 of the inner liner layer 1. In addition, direct contact between the inner liner layer 1 and the outer, fibre-reinforced, pressure supporting layer 2 is possible.

Naturally, the outer, fibre-reinforced, pressure supporting layer 2 can also be employed in other appropriate ways.

Alternatives of interest may, e.g., be hand lay-up, employment of preimpregnated mats or tapes (tape laying), injection lamination, RTM-method (resin transfer molding), filament winding or braiding. The outer, fibre-reinforced, pressure supporting layer 2 may possibly be made of a translucent material, so as to make it easier to see the level in the pressure container.

What is claimed is:

1. Method for manufacturing a pressure container, comprising an inner liner layer of polymer material, such as polyolefines, or similar, and an outer, fibre-reinforced, pressure supporting layer, characterized in, during rotation of the inner liner layer (1) relative to treatment, employment, and/or winding equipment, treatment of the outer side (3) of the inner liner layer (1) so as to increase the wetting and adhesive properties of the polymer material, employing an adhesive at the outer side (3) of the inner liner layer (1) and/or in direct contact between the outer side (3) of the inner lining layer (1) and the inner side (4) of the outer, fibre-reinforced, pressure supporting layer (2), for adhering the inner liner layer (1) and the outer, fibre-reinforced, pressure supporting layer (2), and winding of the outer, fibre-reinforced, pressure supporting layer (2) onto the inner liner layer (1).

2. Method according to claim 1, characterized in that the treatment of the outer side (3) of the inner liner layer (1) comprise flame treatment.

3. Method according to claim 1, characterized in that the treatment of the outer side (3) of the inner liner layer (1) comprise corona discharge treatment.

4. Method according to claim 3, characterized in that the treatment of the outer side (3) of the inner liner layer (1) comprise ozone treatment.

* * * * *